(12) United States Patent
Hosseini et al.

(10) Patent No.: US 12,267,540 B2
(45) Date of Patent: Apr. 1, 2025

(54) CAPTION ANOMALY DETECTION

(71) Applicant: Comcast Cable Communications, LLC, Philadelphia, PA (US)

(72) Inventors: Mohammad Hosseini, Schaumburg, IL (US); Anthony J. Braskich, Kildeer, IL (US); Ronald O. Lenk, Washington, DC (US); Vipulkumar A. Patel, Johns Creek, GA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 11 days.

(21) Appl. No.: 17/590,317

(22) Filed: Feb. 1, 2022

(65) Prior Publication Data

US 2023/0247188 A1 Aug. 3, 2023

(51) Int. Cl.
*H04N 21/24* (2011.01)
*G06V 20/62* (2022.01)
*G06V 30/30* (2022.01)
*H04N 5/278* (2006.01)
*H04N 17/00* (2006.01)
*H04N 21/488* (2011.01)

(52) U.S. Cl.
CPC ....... *H04N 21/2407* (2013.01); *G06V 20/635* (2022.01); *G06V 30/30* (2022.01); *H04N 5/278* (2013.01); *H04N 17/00* (2013.01); *H04N 21/4888* (2013.01)

(58) Field of Classification Search
CPC .... H04N 17/00; H04N 5/278; H04N 21/2407; H04N 21/4888; G06V 30/30; G06V 20/635
See application file for complete search history.

(56) References Cited

U.S. PATENT DOCUMENTS

| | | | |
|---|---|---|---|
| 9,485,525 B1 * | 11/2016 | Oztaskent | H04N 21/25866 |
| 2011/0179445 A1 * | 7/2011 | Brown | H04N 21/812 725/32 |
| 2017/0302989 A1 * | 10/2017 | Diggins | H04N 21/4884 |
| 2018/0199074 A1 * | 7/2018 | Potesta | H04N 21/222 |
| 2019/0089951 A1 * | 3/2019 | Jones | H04N 21/4884 |

FOREIGN PATENT DOCUMENTS

JP 2017045027 A * 3/2017

* cited by examiner

*Primary Examiner* — Jefferey F Harold
*Assistant Examiner* — Alexander Boyd
(74) *Attorney, Agent, or Firm* — Banner & Witcoff, Ltd.

(57) ABSTRACT

Systems, apparatuses, and methods are described for detecting anomalies in closed captioning or other video presentation systems. Anomaly detection may involve comparing detected captions that are delivered to one or more end devices (return captions) with corresponding scheduled captions. Other types of information may also be similarly compared between original scheduled instances of information to be delivered with the actual (return) delivered information. Such other types of information may include, for example, ratings information (such as V-chip ratings and/or flags) and/or content (e.g., advertisement) insertion information such as SCTE-35 signaling.

24 Claims, 16 Drawing Sheets

CAPTION ANOMALY DETECTION

BACKGROUND

There is a need to automatically monitor the delivery, quality and other characteristics in a content delivery system. Closed captioning data in content may be utilized for such monitoring, and systems and methods can be deployed to detect problems with closed captions and content delivery.

SUMMARY

The following summary presents a simplified summary of certain features. The summary is not an extensive overview and is not intended to identify key or critical elements.

Systems, apparatuses, and methods are described for detecting anomalies in closed captioning or other video presentation systems. Anomaly detection may be performed based on sampling detected captions generated for delivery to one or more end devices (referred to herein as return captions) and comparing them with corresponding original (scheduled) captions. The comparison may involve comparing the return captions with corresponding scheduled captions within a sliding time window, such that multiple comparisons within various updated time windows may be performed. The length of the time window may extend a certain amount of time (for example, twenty seconds behind a current time) and/or extend a certain amount of time (for example, twenty seconds in the future from the current time), and its length may be dynamically changed over time based on previous comparison outcomes. The comparisons may also involve forward detection where scheduled captions are the source of the comparison and/or reverse detection where the return captions are the source of the comparison. Other types of information may also be similarly compared and confirmed between original scheduled instances of information with the return (for example, delivered) information. Such other types of information that may be compared and/or confirmed may include, for example, ratings information (such as V-chip ratings and/or flags) confirmation, content delivery and presentation confirmation (e.g., confirmation of delivery and presentation of feature content and/or advertisement content), and insertion information, such as Society of Cable Telecommunications Engineers (SCTE)-35 signaling or any other insertion markers, and content related to or associated with the insertion information.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
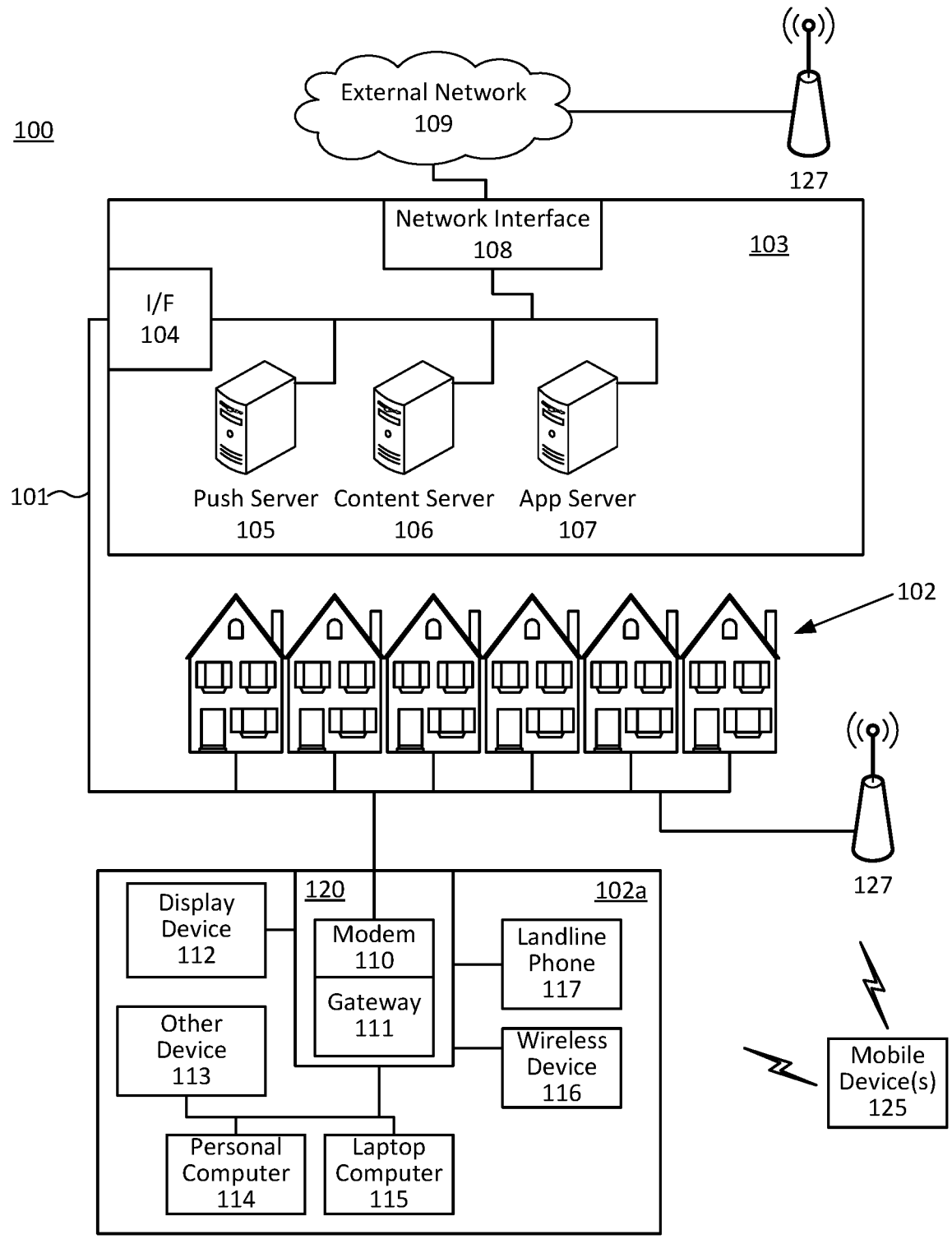
FIG. 1 shows an example communication network.

The accompanying drawings, which form a part hereof, show examples of the disclosure.

It is to be understood that the examples shown in the drawings and/or discussed herein are non-exclusive and that there are other examples of how the disclosure may be practiced.

FIG. 1 shows an example communication network 110 in which features described herein may be implemented. The communication network 110 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 110 may use a series of interconnected communication links 111 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 111. Each of the premises 102 may comprise devices, described below, to receive, send, and/or otherwise process those signals and information contained therein.

The communication links 111 may originate from the local office 103 and may comprise components not shown, such as splitters, filters, amplifiers, etc., to help convey signals clearly. The communication links 111 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 111. The interface 104 may be configured to manage communications among those devices, to manage communications between those devices and backend devices such as servers 105-107, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements or other content such as captions in a video stream and/or other content being transmitted to devices in the premises 102 and/or to the mobile devices 125. The local office 103 may comprise additional servers, such as additional push, content, and/or application servers, and/or other types of servers. Although shown separately, the push server 105, the content server 106, the application server 107, and/or other server(s) may be combined. The servers 105, 106, and/or 107, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 111. The interface 120 may comprise a modem 120, which may comprise transmitters and receivers used to communicate via the communication links 111 with the local office 103. The modem 120 may comprise, for example, a coaxial cable modem (for coaxial cable lines of the communication links 111), a fiber interface node (for fiber optic lines of the communication links 111), twisted-pair telephone modem, a wireless transceiver, and/or any other desired modem device. One modem is shown in FIG. 1, but a plurality of modems operating in parallel may be implemented within the interface 120. The interface 120 may comprise a gateway 121. The modem 120 may be connected to, or be a part of, the gateway 121. The gateway 121 may be a computing device that communicates with the modem(s) 120 to allow one or more other devices in the premises 102a to communicate with the local office 103 and/or with other devices beyond the local office 103 (e.g., via the local office 103 and the external network(s) 109). The gateway 121 may comprise a set-top box (STB), digital video recorder (DVR), a digital transport adapter (DTA), a computer server, and/or any other desired computing device.

The gateway 121 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

In addition to delivering audio and/or video content, the application server 107, and/or one or more other servers and/or other devices, may insert caption data into audio and/or video content and/or otherwise supplement the audio and/or video content with the caption data, such as into video streams that are to be delivered to end devices (e.g., any of the devices at premises 102a). The caption data may comprise, for example, closed-captioning (CC) text associated with words that are spoken in the audio and/or video content. The end devices that receive the audio and/or video content may also receive the caption data and may be configured to present captions based on the caption data, by, for example, causing captions to be displayed or otherwise presented to an end user in conjunction with the audio and/or video content.

The application server 107, and/or one or more other servers and/or other devices, may also insert content ratings data into the audio and/or video content and/or otherwise supplement the audio and/or video content with the content ratings data. The content ratings data may include, for example, Extended Data Services (XDS) data, and may be formatted, for example, to be compatible with the V-chip rating system. The end devices that receive the audio and/or video content may also receive the content ratings data and may be configured to act based on the content ratings data. For example, an end device may selectively either allow one or more portions of the received audio and/or video content to be presented, or block one or more portions of the received audio and/or video content from being presented, based on the content ratings data associated with those one or more portions of the received audio and/or video content.

The application server 107, and/or one or more other servers and/or other devices, may comprise an anomaly detection processing component that is configured to monitor (for example, intercept or receive a copy of) and analyze the caption data that is delivered, where the delivered caption data (and associated content) may also be delivered to end devices such as those devices at premises 102a. Other types of data, such as content ratings data and/or content flags, may further be monitored and analyzed in a similar manner. The data being monitored (for example, delivered caption data or delivered ratings data) is referred to herein as return data (for example, return captions or return ratings). As will be described below, such monitoring and analysis of the return data may entail detecting anomalies in the return data and/or correcting those anomalies.

Figure 2:
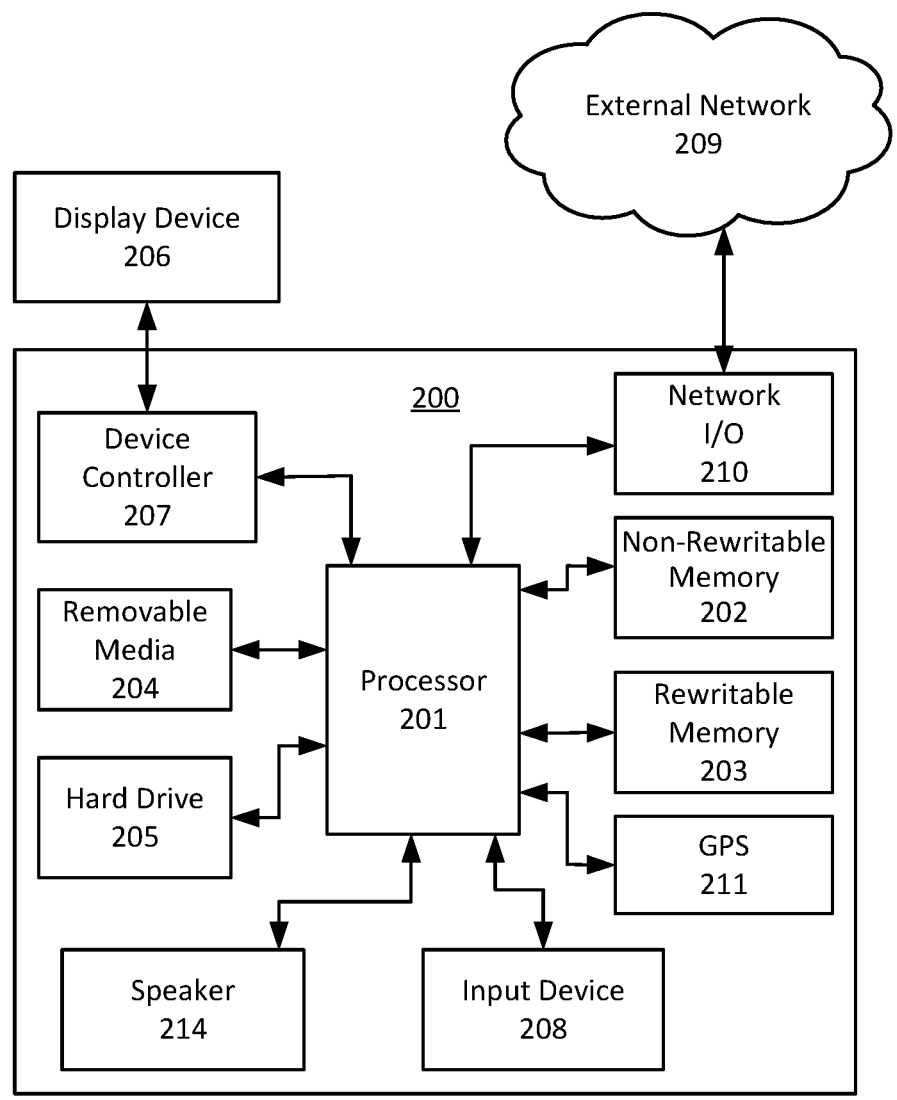
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein. The computing device 200 may also implement the anomaly detection processing component described herein. The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 111 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

As discussed above, caption data may be delivered in conjunction with other content such as associated audio and/or video content. The caption data may be predetermined and/or stored, and may be associated with one or more portions of audio and/or video content. For example, the audio and/or video content may include a set of timestamps, and the caption data may be associated with one or more portions of the audio and/or video content by referencing to those timestamps. For example, if first caption data is to be associated with a first audio and/or video content portion (e.g., such that the first caption data would result in captions displayed during the first audio and/or video content portion), then the first caption data may include a reference to a timestamp of the first audio and/or video content portion. Likewise, if different second caption data is to be associated with a different second audio and/or video content portion (e.g., such that the second captions would result in captions displayed during the second audio and/or video content portion), then the second caption data may include a reference to a timestamp of the second audio and/or video content portion. The end device receiving the caption data and the audio and/or video content may present (e.g., display) captions based on the caption data beginning at (or near) the timestamp of the corresponding audio and/or video content as indicated by the caption data.

The anomaly detection processing component (e.g., via the content server 106 and/or one or more other servers and/or devices) may retrieve the predetermined and/or stored caption data (referred to herein as scheduled caption data), such as from a caption database (which may be in communication with the anomaly detection processing component), and deliver the caption data along with the audio and/or video content associated with the caption data. Due to issues that may be present in the retrieving process and/or the delivery network, anomalies between scheduled caption data and actual return caption data may occasionally occur.

For example, the return caption data may be jumbled or scrambled as compared with scheduled caption data, or a presented caption may be frozen, or the return caption data may be mis-timed for delivery at a wrong timeframe with respect to associated delivered audio and/or video content. This may result in, for example, captions that are delivered to and presented by an end device significantly later than intended, or typographical errors occurring in the presented captions. Detection of anomalies in streamed captions may be a challenging problem; techniques relying on dictionaries, such as evaluating if words in a streamed caption are present in a dictionary, may be insufficient. This is because original scheduled captions may include words such as character names or fictional terms that do not exist in standard dictionaries.

Moreover, time offsets introduced during the delivery of content with captions (e.g., due to network congestion or other delays), as well as the difficulty of performing real-time anomaly detection with only light-weight overhead, may raise further challenges for anomaly detection. It may also be desirable to provide two-way detection (e.g., forward detection and reverse detection, described below). Scheduled captions may be missing in the return captions (for example, upon delivery to the end devices), and return captions may include captions that have not been scheduled. Forward detection may be used to detect the former situation, and reverse detection may be used to detect the latter situation. And, even when scheduled captions match return captions, this might not be detected where, for example, the scheduled captions may include certain characters (for example, signs, quotation marks, etc.) that might not be intended for delivery of captions or compatible with delivery of captions. Thus, it may be desirable for the anomaly detection algorithm to ignore certain characters in the scheduled captions and/or in the return captions for comparison purposes.

It may further be desirable to perform anomaly detection for other types of data, for example XDS data (comprising, for example, V-chip rating data) and/or content insertion signals, such as SCTE-35 signaling used in live over-the-top (OTT) streaming for signaling timing of an advertisement insertion opportunity. SCTE-35 is also known as Digital Program Insertion Cuing Message for Cable. Moreover, it may be desirable to be able to confirm that a scheduled item of content (such as an advertisement) was correctly delivered to end users. For example, detection of a scheduled content insertion signal for a given item of inserted content may trigger a process where scheduled closed captioning for the item of scheduled content is compared with delivered (return) closed captioning for the item of scheduled content.

There is therefore a need to monitor and analyze the return caption data and/or other types of return information (e.g., return XDS data and/or return SCTE-35 signaling) to detect anomalies and/or to confirm correct delivery of inserted content and/or of closed captioning for inserted content. There is further a need to correct detected anomalies by, for example, modifying the scheduled caption data.

Figure 3:
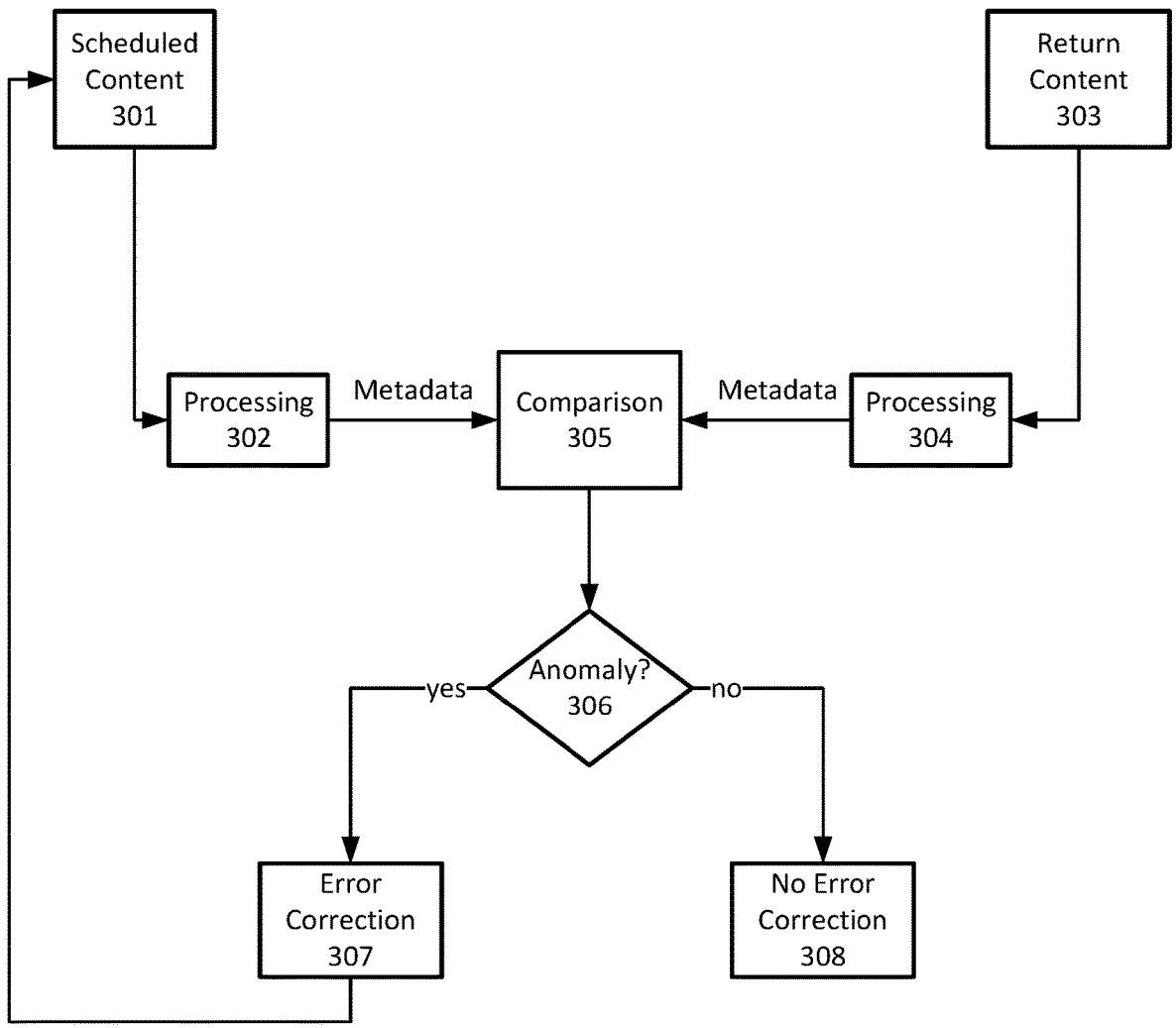
FIG. 3 is a flow chart showing an example method for detecting caption anomalies.

An example flowchart for detecting caption anomalies is shown in FIG. 3. Any of the steps of FIG. 3 may be performed by the anomaly detection processing component, which, e.g., may be a software and/or hardware component implemented by one or more devices such as the application server 107. At step 301, stored original content to be delivered (scheduled, or original, content), including associated original caption data (scheduled captions), may be retrieved. The scheduled content may comprise, for example, MP4 audio and/or video data as well as the caption data, such as closed-captioning information associated with the audio and/or video data. At step 302, the original scheduled content may be processed to extract and/or determine the caption data or other data derived from the scheduled caption data, which is referred to by way of example in FIG. 3 as scheduled metadata. An example of scheduled caption data that may provide one or more scheduled captions, which the scheduled metadata may be based on, is as follows:

```
{
  "startTime": 433,
  "endTime": 900,
  "capText": "The quick brown fox jumped over the lazy dog."
  "mode": "POP"
},
{
  "startTime": 4633,
  "endTime": 7166,
  "capText": "Four score and seven years ago,"
  "mode": "POP"
}
```

Simultaneously or at a different time, at step 303, content that is actually delivered, such as to the end devices, may be sampled. In addition to video and/or audio components, the sampled content (referred to herein as return content) may also include caption data. The return content may be sampled at any location in the network, for example at the downlink of a satellite distribution link, within or at the edge of network 109, at network interface 108, or at any of servers 105-107. The location at which the return content is sampled may be selected, for example, such that any anomalies in the captions that are delivered to the end devices are also experienced in the captions of the return content (the return captions) obtained at the sampling location. At step 304, the sampled return content may be processed to extract and/or determine the caption data or other data derived from the caption data, which is also referred to by way of example in FIG. 3 as return metadata. For example, optical character recognition (OCR) may be performed on one or more video frames (or a selected portion of the video frames, such as a portion where closed captioning text is expected to be presented such as the bottom portion (e.g., bottom half or bottom third) of each video frame) of the return content to detect and read closed captioning or other text in the return content. Where the scheduled caption data is the example shown above, then each of the scheduled metadata and the extracted return metadata may be expected to be something like the following strings of text:

The quick brown fox jumped over the lazy dog.

Four score and seven years ago,

However, it is possible that an anomaly may occur in the return captions. For example, there may be a character missing, an incorrect character substitution, and/or an incorrect character addition, such as "The quick browA fox jumped over the lazy dog." As another example of an anomaly, the timing of a return caption may be significantly delayed, such as due to network congestion or other causes of delay. As another example of an anomaly, a displayed caption may be frozen, such that the displayed caption does not change as scheduled and/or remains for an extended period of time.

Figure 4:
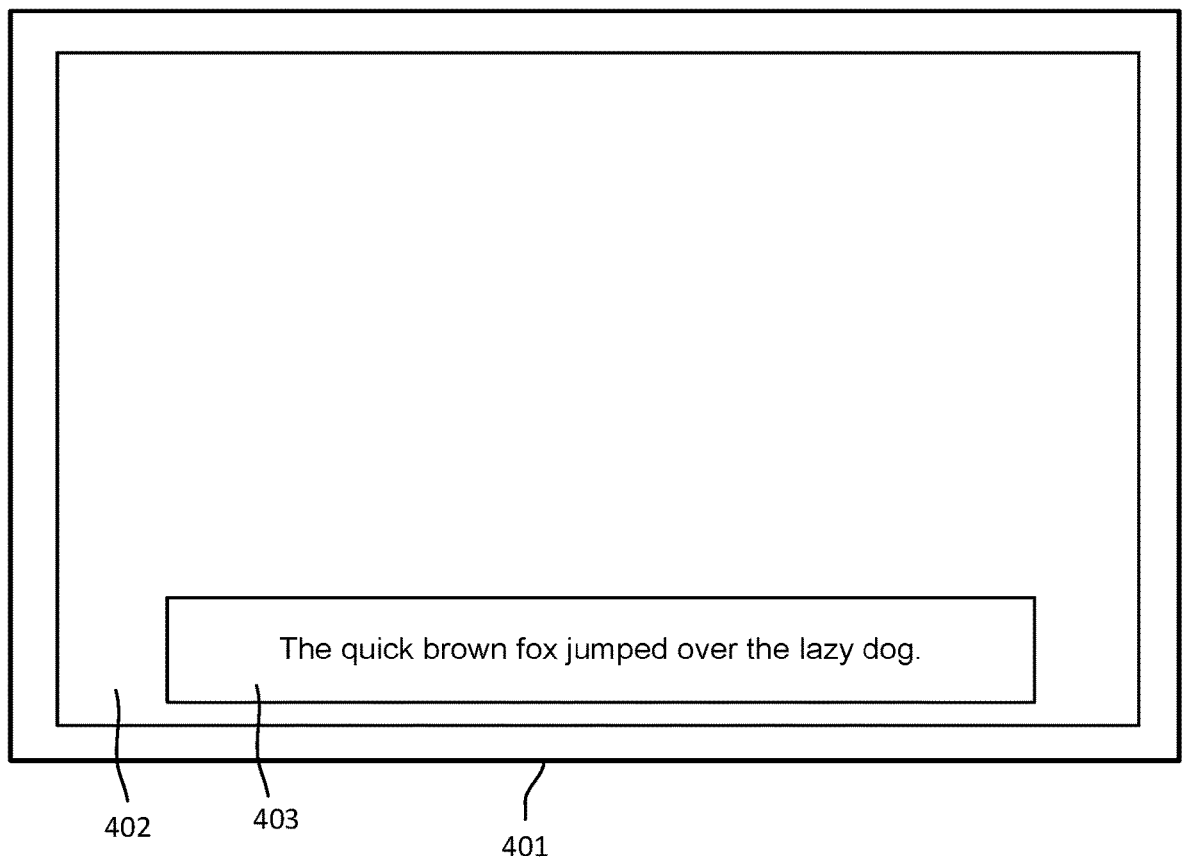
FIG. 4 is an example of a screenshot of content with captioning that may be presented at an end device.

FIG. 4 shows an example screenshot 401 of how a portion of the return captions may appear, such as at the end device to which content (with captions) identical to the return content may also be delivered. The screenshot 401 may be displayed via a display device (such as a television set or a computer screen) of the end device, and may include content such as video 402 in combination with (for example, overlaid with or next to) a caption 403.

Returning to FIG. 3, at step 305, the original metadata resulting from the processing of step 302 and the return metadata resulting from the processing of step 304 may be compared. At step 306, it may be determined whether there are any anomalies (e.g., whether there are any differences between the two sets of metadata). For example, if the original metadata (resulting from processing step 302) is different from the return metadata (resulting from processing step 304), then step 306 may result in a determination that an anomaly exists. Such differences may occur, for example, where the text of a caption differs between the original content and the return content, or where the text may be the same but the return caption timing is different from the timing of the caption in the original content. If the two sets of metadata are identical, then step 306 may result in a determination that an anomaly does not exist, and the process may move to step 308, which represents a state of no error correction being needed. In this state of step 308, it may be confirmed that the return metadata sufficiently matches the scheduled metadata, and therefore was correctly delivered as scheduled. Also as part of step 308, a computing device (such as any of servers 105-107) may generate data, associated with the scheduled metadata and/or matching return metadata, that indicates a confirmation that the scheduled metadata was successfully delivered. The computing device may store this data, referred to herein as a match report, and may further indicate the confirmation via a user interface to a human, such as via a display device connected to or part of the computing device. For example, the match report, or an indication of the match associated with the match report, may be displayed.

If there is an anomaly detected at step 306, then at step 307 the anomaly may be corrected by performing error correction on the original, or scheduled, content 301. For example, steps may be automatically and/or manually taken to correct the caption data for the original content 301. For example, where one or more control characters cause a caption to be erroneously misplaced in time and/or garbled with respect to the audio and/or video components of associated content, or even to be missing altogether, the control characters may be corrected. Such a correction may prevent the error from reoccurring in the event that the content (with its associated captions) is re-transmitted at a future time. For example, it may be expected that the content is scheduled to be sent to end devices multiple times in the future (e.g., scheduled at certain times of day and/or days of the week). Where the content is on-demand content that is not necessarily scheduled, it may be expected that the content will be requested again in the future. In either situation, correcting the original caption data (e.g., the original, or scheduled, metadata) may prevent recurrence of the same caption anomaly. At step 307, data may also be generated indicating the anomaly, which will be referred to herein as an anomaly report.

To account for time disparities between the original metadata and the return metadata, the comparison at 305 may be determined for original metadata and return metadata that occur within a particular window of time, such as a sliding window of time. Any of steps 302-307 may be performed repeatedly and/or continuously over a plurality of such windows of time, such as during a portion of or the entirety of the content being captioned.

An example of how anomaly detection at step 306 may be performed (e.g., by the anomaly detection processing component) is described with reference to FIGS. 5-10. Anomaly detection may utilize forward detection (e.g., FIG. 5), which may involve comparing each return metadata with a corresponding original metadata that are both associated with the same time window. Anomaly detection may additionally or alternatively utilize reverse detection (e.g., FIG. 6), which may involve comparing each original metadata with a corresponding return metadata that are both associated with the same time window. Anomaly detection may involve both forward detection and reverse detection operating in parallel, such as simultaneously (e.g., FIG. 7). Non-limiting examples of the time window may include, for instance, a 40 second time window, or a time window having a length between 20 seconds and 40 seconds, between 30 seconds and 50 seconds, or between 40 seconds and 60 seconds. However, the time window may be shorter or longer than these examples. As will be described further, the time window may dynamically change over time based on feedback results from previous anomaly detection iterations.

Figure 5:
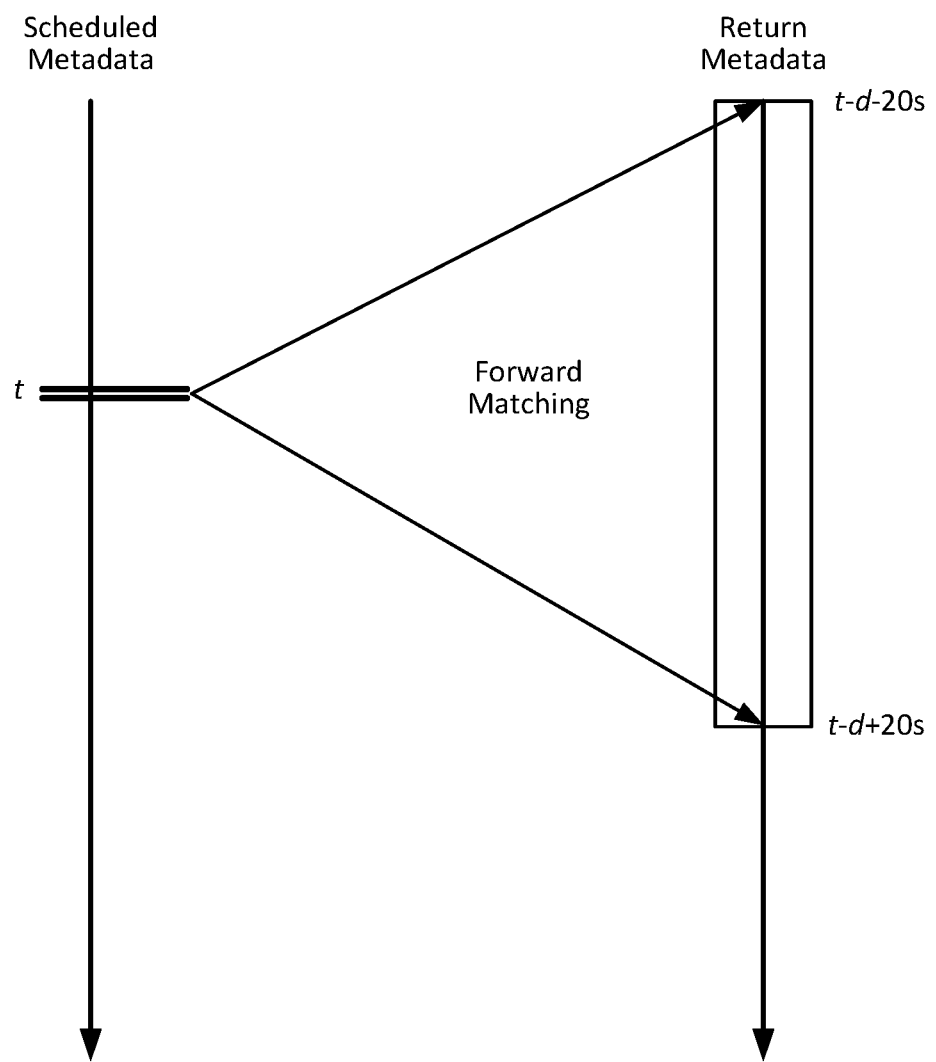
FIG. 5 shows an example of forward matching detection for caption metadata.
Figure 6:
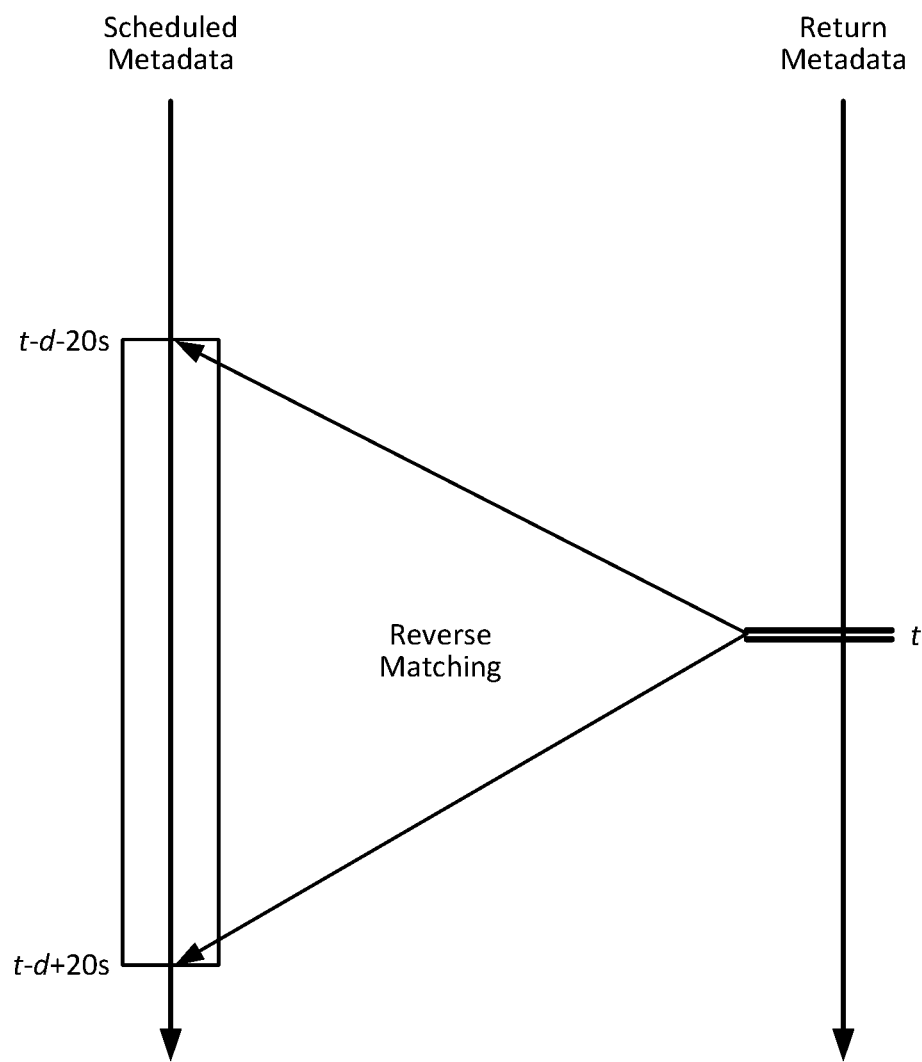
FIG. 6 shows an example of reverse matching detection for caption metadata.
Figure 7:
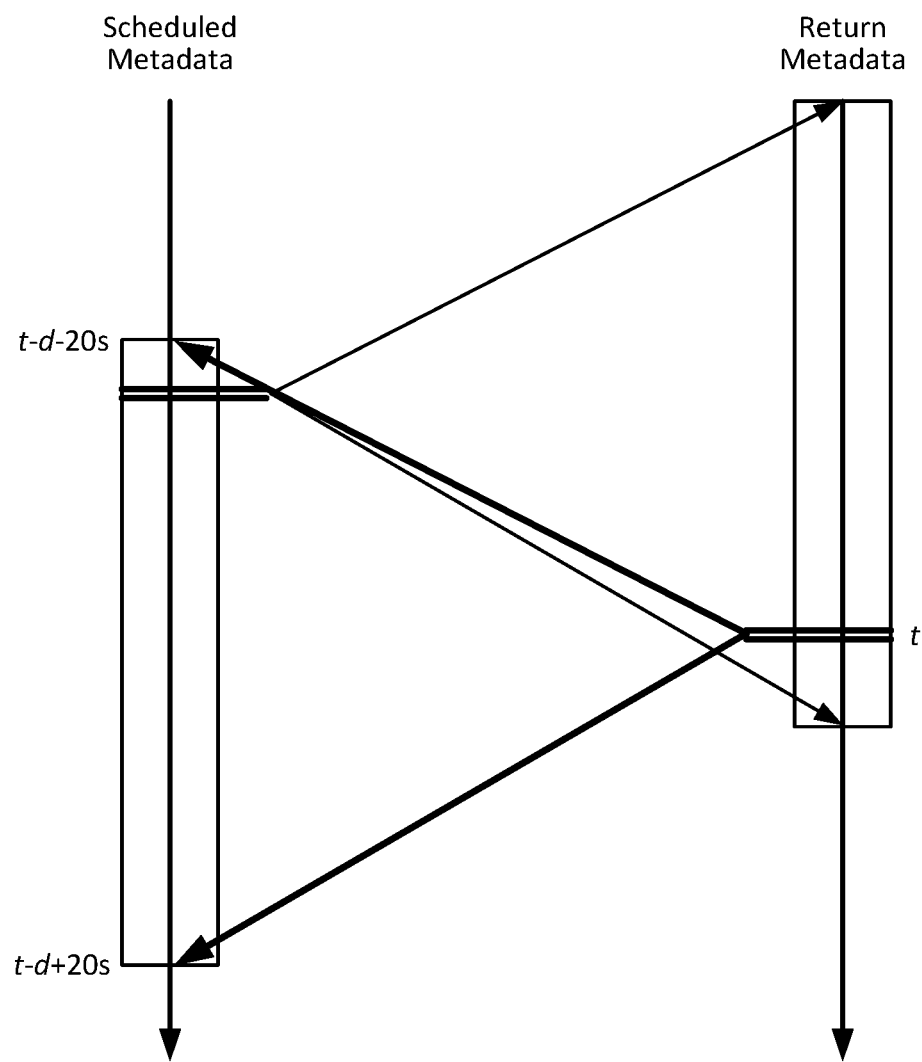
FIG. 7 shows an example of simultaneous forward and reverse matching detection for caption metadata.

FIG. 5 illustrates an example of forward detection that may be performed as part of step 306, and FIG. 6 illustrates an example of reverse detection that may be performed as part of step 306. Forward detection and reverse detection may be used separately, or may be used together (e.g., simultaneously) for comparing the same sets of metadata, such as shown in FIG. 7. In the examples shown in FIGS. 5-9, the time window is 40 seconds, some portion of which (e.g., half) is prior to a current time t and the remaining portion of which (e.g., the other half) is after the current time t. Using forward detection (for example, as in FIG. 5 or 7), for each scheduled caption of a plurality of scheduled captions, a time window corresponding to the scheduled caption may be determined, a return caption, of a plurality of return captions, may be determined that is generated for delivery via a network and within the time window, and the scheduled caption and the return caption may be compared. Based on the comparison, a match report or an anomaly report may be generated. Moreover, based on the comparison resulting in an anomaly determination, the one of the plurality of scheduled captions may be modified, such as to correct the scheduled caption to remove the anomaly for the next time that the caption is to be delivered. Thus, for example, for each caption Co associated with (e.g., stamped at) time t in the scheduled content, the caption text and duration thereof of one or more captions during the time interval [t−d−W, t−d+W] in the return metadata may be compared with the caption text for caption Co and duration thereof in the original metadata, where d is an offset and 2 W is the span of the time window. In the shown example, 2 W equals 40 seconds in this example (thus, in this example, W=20 seconds). However, W may be of any fixed or variable value.

Using reverse detection (for example, as in FIG. 6 or 7), for each return caption of a plurality of return captions that are generated for delivery via a network, a time window corresponding to the return caption may be determined, a scheduled caption, of a plurality of scheduled captions, that is scheduled within the time window may be determined; and the scheduled caption and the return caption may be compared. Based on the comparison, a match report or an anomaly report may be generated. Moreover, based on the comparison resulting in an anomaly determination, the content containing the plurality of scheduled captions may be modified, such as to correct the scheduled caption to remove the anomaly for the next time that the caption is to be delivered. Thus, for example, for each caption $C_R$ associated with (e.g., stamped at) time t in the return content, the caption text and duration thereof of one or more captions during the time interval [t−d−W, t−d+W] in the original metadata may be compared with the caption text for caption $C_R$ and duration thereof in the return metadata.

Other values of W may be selected, however if W is too high, this might increase the chances of excessive false negatives (missing anomalies). On the other hand, where W is too low, this may increase the chance of excessive false positives (finding anomalies that are unimportant or that do not exist) due to minor expected arrival delays of the return content. Thus, a value of W may be selected for a particular content delivery scenario that makes a tradeoff to minimize such false-negative outcomes and such false-positive outcomes.

To make anomaly detection potentially more accurate, an expected arrival delay of return content may be taken into account, and may be represented as time offset d. The arrival delay d may represent, for example, the amount of time it takes for the original content to be delivered through a network and received by the anomaly detection processing component. Thus, when comparing original metadata and return metadata, the arrival delay d may be used as a time offset. For example, the time window used in the comparison may be offset in time by d, such that the time window for the original metadata (for reverse detection) or the return metadata (for forward detection) may be [t−d−W, t−d+W].

To compare the original metadata with the return metadata (for either forward or reverse detection), the comparison may include calculating a value that represents a difference between the original metadata and the return metadata. For example, a difference value of zero may indicate that the original metadata and the return metadata are identical in both time and in content, whereas another difference value may indicate that the original metadata and the return metadata are different in time and/or in content. One known way of determining a difference between two sets of data is by calculating the Levenshtein distance. The Levenshtein distance indicates the minimum number of single-character edits (insertions, deletions, substitutions) needed to change one set of data into the other set of data. While Levenshtein distance is described herein by way of example, other difference measures may be used.

For example, assume that a first set of metadata M1 (e.g., one of the original metadata or the return metadata within its window at a given time) is to be compared with a second set of metadata M2 (e.g., the other of the original metadata or the return metadata during tis window at the given time). The Levenshtein distance between M1 and M2 may be used to see whether M1 matches (e.g., is sufficiently the same as) M2, such as by using the following algorithm: if $1-(LV\_DIST(M1, M2)/Max(M1.length, M2.length)>T$, then there is a match and no anomaly is found between metadata M1 and metadata M2. Otherwise, there is not a match (e.g., they are not sufficiently similar because the Levenshtein distance is too large) and an anomaly is determined to exist. In this example, LV_DIST represents a function that determines a Levenshtein distance between M1 and M2, M1.length and M2.length respectively represent the lengths (e.g., the total number of characters) of M1 and M2, and T represents a matching threshold. In the context of the particular example equation disclosed above, T may be of any value greater than zero and less than one; non-limiting examples include a value of 0.9, a value of between 0.85 and 0.95, or a value of between 0.7 and 0.9.

As discussed above, the window encompassing the original metadata and/or the return metadata may be offset by expected arrival delay d. Network conditions may change over time, and as a result the actual arrival delay experienced by an end user may change over time. For example, transient network congestion may cause the actual arrival delay to temporarily increase. Thus, it may be desirable for expected arrival delay d to be able to dynamically change with detected changing network conditions, so as to better track the actual experienced arrival delay. For example, each time a match is found (e.g., there is no anomaly determined to exist between the original metadata and the return metadata), the time offset between the original metadata and the return metadata may be determined and may be used to update the expected arrival delay d. The time offset between the original metadata and the return metadata may be determined in a variety of ways, however the Levenshtein distance (e.g., (LV_DIST(M1, M2)) may be used to determine if the expected arrival delay d is to be changed. For example, as illustrated previously, if M1 represents an original metadata caption, and M2 represents a return metadata caption, and the evaluation of $1-(LV\_DIST(M1, M2)/Max(M1.length, M2.length)>T$ is true, indicating there is a match, then the value of arrival delay d can be changed. The value of d is updated to the difference between the timestamps associated with M1 and M2.

Anomaly detection at step 306 may additionally or alternatively perform frozen caption detection, which may involve comparing the original metadata with the return metadata over a much longer time window, and/or may involve detecting no change in the return metadata over a much longer time window.

Figure 8:
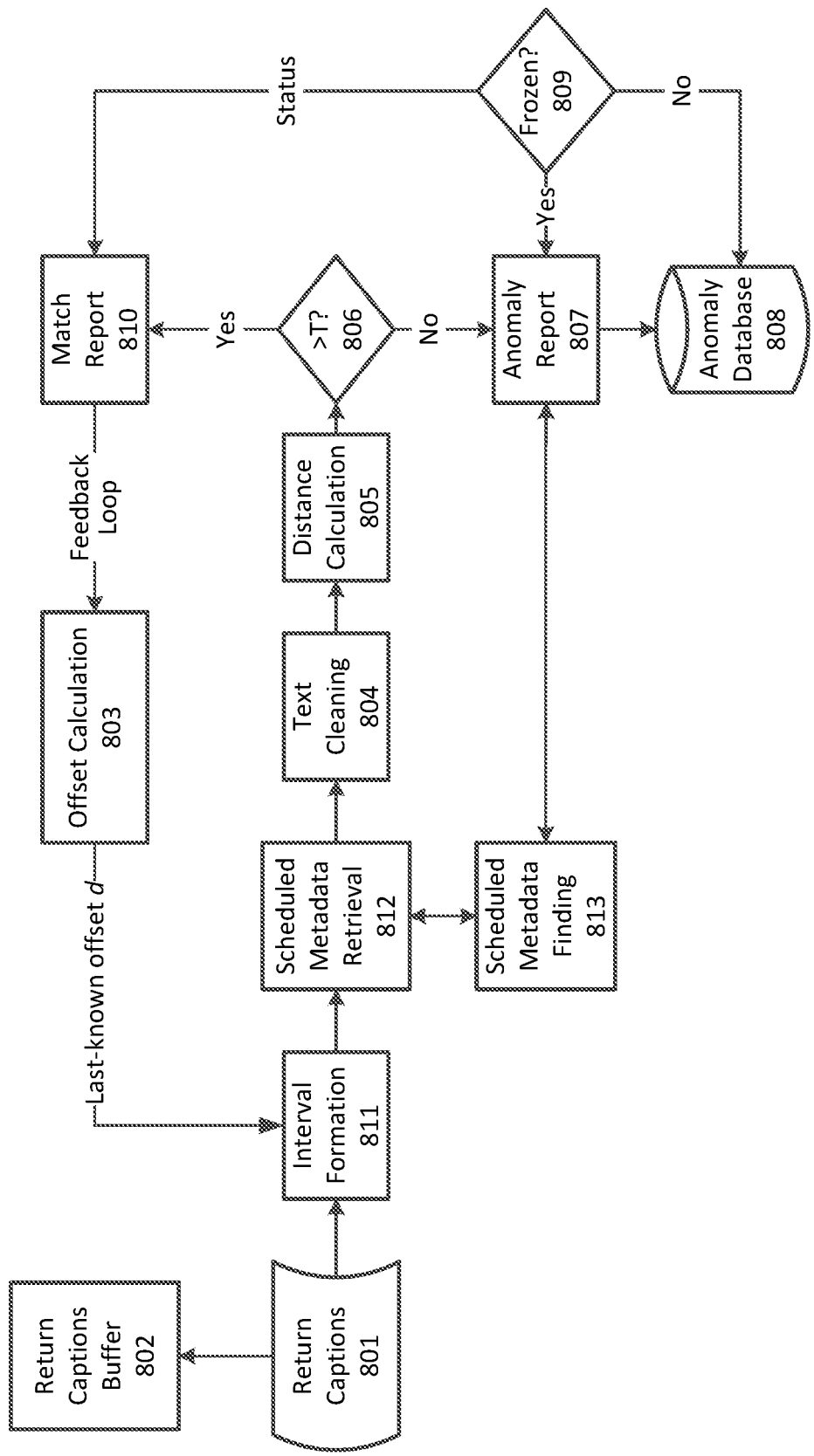
FIG. 8 is a flow chart showing an example process using forward matching for determining whether return captions sufficiently match scheduled captions.

FIG. 8 is a block diagram of an example process that includes performing forward detection. The process of FIG. 8 may be an implementation of one or more portions of the process of FIG. 3. At step 801, return content may be sampled to extract captions therein. These extracted captions will be referred to herein as return captions. The return captions may be stored in a return captions buffer 802, which may be used for temporary storage of the return captions for use during the matching (distance calculation) process at step 805. At step 811, a time interval of the sliding window may be determined. The interval of the window may be a default length (e.g., predetermined), and may have a beginning that is based at least in part on t and the last-known time offset d. Thus, step 811 may determine the window of time (for example, [t−d−20 seconds, t−d+20 seconds]) that is used for retrieval and comparison of the original metadata and the return metadata.

At step 812, the window (also referred to as an interval) determined in step 811 may be used to construct a request for metadata. The request for metadata may be sent to a metadata finding service 813. At step 813, when the request for metadata is received, the original metadata may be found and retrieved from storage and provided in a response. These steps may involve finding and retrieving that original metadata that is within the time window that was determined at step 811. Again at step 812, the found-and-retrieved original metadata as well as the return metadata may be processed and generated (as in steps 302, 304) as part of step 812, or they may have already been processed and generated separately from the process of FIG. 8.

At step 804, the original metadata and/or the return metadata may be processed (referred to herein as text cleaning) to remove one or more portions of data, such as by removing one or more undesired characters, for example by removing or ignoring non-ASCII characters (for example, certain musical symbols), ASCII control characters, non-textual data (for example operators such as +, –, ^, new-line characters, and/or numbers), and/or non-printable characters. This process may be performed as part of steps 302 and 304 (FIG. 3), and may result in the original metadata and the return metadata each containing clean text that is in the same format so that the two sets of metadata are ready for comparison (e.g., at step 305 and/or step 805).

At step 805, a difference between the text-cleaned original metadata and the text-cleaned return metadata may be determined. For example, a distance (for example, a Levenshtein distance) may be found between the text-cleaned original metadata and the text-cleaned return metadata may be determined as described above.

At step 806, it may be determined whether the difference (for example, the Levenshtein distance or other distance) meets a predetermined criterion. For example, it may be determined whether the difference is greater than a predetermined threshold difference. For example, it may be determined whether the ratio of the Levenshtein distance divided by the maximum length of the text-cleaned original metadata and the text-cleaned return metadata is greater than a predetermined value T, such as whether: $1-(LV\_DIST(M1, M2)/Max(M1.length, M2.length)>T$. If not, then an anomaly may be determined to exist and an anomaly report may be generated at step 807. If so, then it may be determined that an anomaly does not currently exist and a match report may be generated at step 810. In addition, the match report, or an indication of the match associated with the match report, may be displayed to a human user, such as via any of servers 105-107. The anomaly report of step 807 may be stored in an anomaly database (step 808). The match report of step 810 may be used, for example, in a feedback loop to determine whether the offset d should be modified to be shorter or longer in time. Thus, for example, the generation, existence, and/or receipt of a new match report may trigger a recalculation of offset d. If the recalculation results in a new value of d, then the new value will be used for the subsequent iteration using the next value of t. Moreover, as will be explained below, the new value of offset d may be based on information contains in the match report. Additionally, at step 807, when no match for a return metadata can be found within the original metadata, and thus no match report is produced, this may trigger a process such as the one shown in FIG. 10, which may be used to determine the likely title and/or other content identifier corresponding to the unmatched return metadata.

The anomaly reports and the match reports may be separate reports or they may be combined into a single report. Below is an example report format in JSON for one caption (e.g., closed-captioning) anomaly (EXAMPLE 1) and for two caption (e.g., closed-captioning) matches using forward detection (EXAMPLE 2) and reverse detection (EXAMPLE 3):

Example 1 (Anomaly Report)

{"caption":"very simple. Just come down and let the chefof love show you what to do.","channel":"cleo-sd","confidenceScore":95,"durationDiff":0,"endTime":1615572937660,"isModified":false,"materialID":"TV1_H27138_01","ssOffset":3822,"startTime":1615572934823,"status":"mismatch","title":"NewSoulKitchenRemix_108_HDAirMaster","type":"cc_mismatch"}

Example 2 (Match Report)

{"caption":"\u003e I told you we're about to get","channel":"cleo-sd","confidenceScore":95,"durationDiff":133,"endTime":1615570010635,"isModified":false,"materialID":"TV1_H24415_05","ssOffset":3935,"startTime":1615570009301,"status":"match","title":"JustEats_101_Revised","type":"cc_match"}

Example 3 (Match Report)

{"caption":"\u003e We're about to get crazy.","channel":"cleo-sd","confidenceScore":95,"durationDiff":133,"endTime":1615570010633,"isModified":false,"materialID":"TV1_H24415_05","ssOffset":3938,"startTime":1615570008733,"status":"match","title":"JustEats_101_Revised","type":"cc_match_reverse"}

As shown in the above example reports, each match report and/or anomaly report may comprise indications of items such as whether there is a mismatch or a match, whether the report is a result of forward detection or reverse detection, the return and/or scheduled caption being reported, a confidence level of the match or anomaly, a difference (e.g., "durationDiff" in the above example reports) in duration of display of the captions between the original metadata and the return metadata as measured in milliseconds (for example), a time difference (e.g., "ssOffset" in the above example reports) between the display time of the return metadata and the original metadata as measured in milliseconds (for example), a start time of the return and/or scheduled caption being reported, and/or a title and/or other identifier of the content being captioned.

For example, the EXAMPLE 1 anomaly report indicates the text of the return caption. Assume by way of example that the original scheduled caption was "Very simple. Just come down and let the chef of love show you what to do." In that case, there would be two errors, or mismatches, in the return caption. First, the scheduled capitalized "V" was incorrectly included in the return caption as a lower-case "v." Second, there is no space between "chef" and "of."

Moreover, still referring to the EXAMPLE 1 anomaly report, the Levenshtein distance between original caption metadata:

Very simple. Just come down and let the chef of love show you what to do.

and return caption metadata:

very simple. Just come down and let the chefof love show you what to do.

may be calculated as, for example, the value 2, because two steps would be needed to transform one of the metadata strings (e.g., the original scheduled caption metadata having a length of 73 characters) into the other metadata string (e.g., the return caption metadata having a length of 72 characters). For example, the transformation may be made by performing one step of changing the upper-case "V" to a lower-case "v" and another step of removing a space between "chef" and "of." Next, using the above-discussed example test of whether 1−(LV_DIST(M1, M2)/Max(M1.length, M2.length)>T, this would be testing whether 1−(2/73)>T, which equals testing whether 0.972>T. If the result is true (for example, if 0.972>T), then there is no anomaly and the two metadata strings may be considered to match, which may be reported. If the result is false (for example, if 0.972<T), then it may be determined that an anomaly (e.g., mismatch) exists, which may be reported.

The confidence level of the match or anomaly may be determined based on the comparison, such as based on the Levenshtein distance. As an example, the confidence value may be computed as 100*(1−(LV_DIST(M1, M2)/Max(M1.length, M2.length))). In this example computation, if two captions match exactly, the LV_DIST will be 0, so the confidence level will be 100. Thus, in this example, the confidence level may have a scale of zero to one hundred. However, other calculations and scales may be used to represent the confidence level. For example, the confidence level may not include the multiplication by one hundred and may instead have a scale of between zero and one. The confidence level may further be translated or otherwise computed to be in any other format such as a non-numerical value, for example as confidence level A, confidence level B, and confidence level C (where A is higher than B, which is higher than C). The confidence level may be used as a factor in determining whether a reported match truly is a match.

In parallel, step 809 may determine whether the return caption is frozen, such as by determining whether it has changed over a sliding time window having a predetermined time width. The time width may be, for example, about 60 seconds, or of any other value. If it is determined that the return caption is frozen, then an anomaly report may be generated at step 807. If the return caption is not frozen, a report that the captions are not frozen may be stored in the anomaly database at step 808. The determination of the captions being frozen may also be considered in the generation of the match report at step 810. If the captions are determined at step 809 to be frozen, then a match report at 810 may not be generated because a match report would be an indication that return captions are operating normally, which is not the case if they are frozen.

At step 803, in response to a match report being generated at step 810, the time offset d may be updated so that the next interval formed (in the next iteration of step 811 for the next value of t) for the next comparison (at step 805) may be updated in accordance with the new value of d. The value of the time difference between the display time of the return metadata and the original metadata may be determined based on the match report (for example from the ssOffset field) and used as (or otherwise used to determine) the new value of d. Thus, step 803 may determine the updated value of d based on the value of a field (such as the ssOffset field) in the match report. For example, the EXAMPLE 2 match report shown above indicates an ssOffset of 3935 milliseconds, and d may be updated to be equal to ssOffset (such that d=3935 milliseconds). When a subsequent match report is generated in a subsequent iteration of step 810 (for a subsequent time t), d may again be updated (in a subsequent iteration of step 803) based on the ssOffset field in the subsequent match report. This process may be repeated for each new match report.

Figure 9:
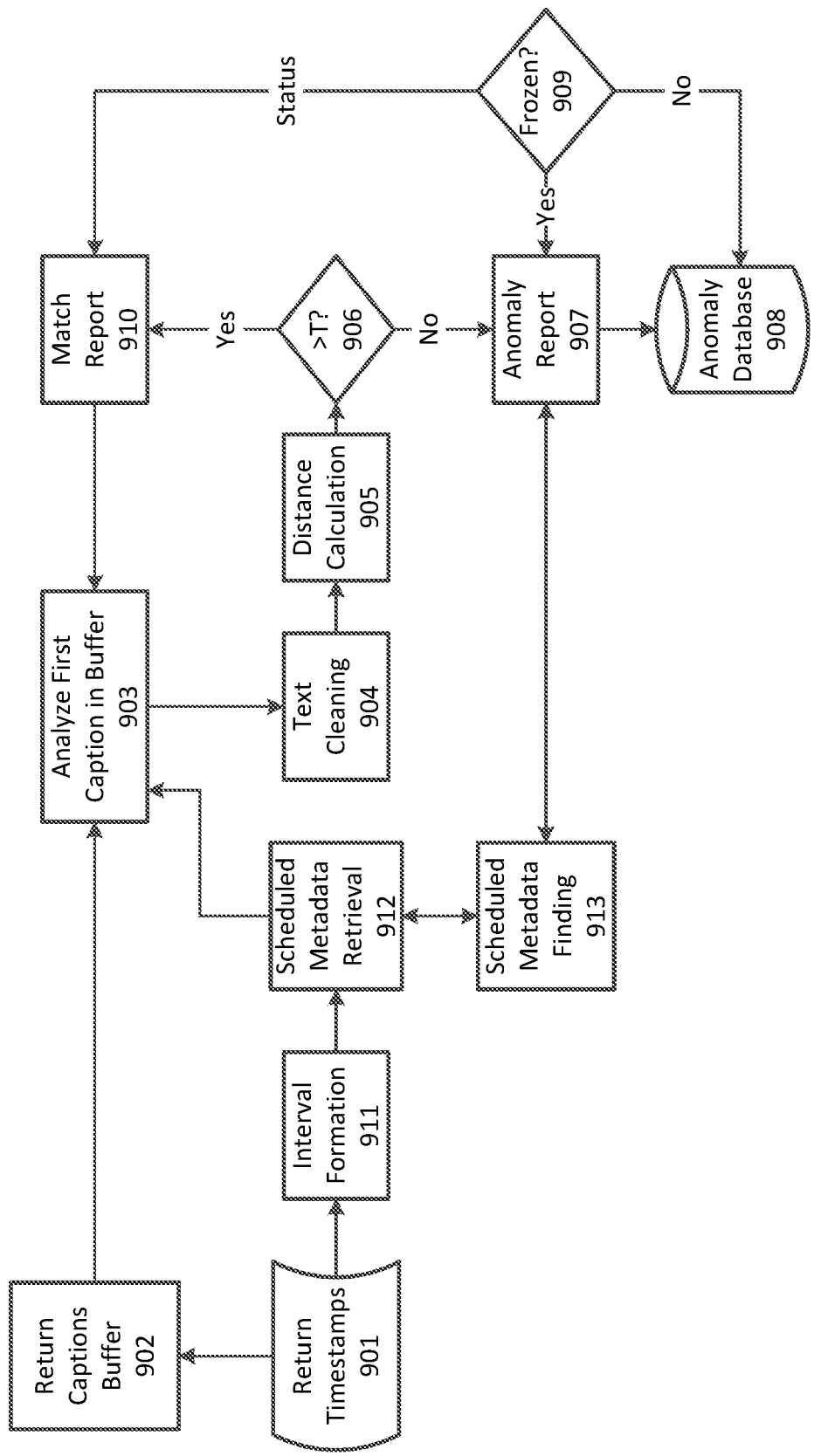
FIG. 9 is a flow chart showing an example process using forward matching for determining whether return captions sufficiently match scheduled captions.

FIG. 9 is a block diagram of an example process that includes performing reverse detection. The process of FIG. 9 may be an implementation of one or more portions of the process of FIG. 3, and may also be implemented in parallel with the process of FIG. 8. In general, steps 901, 902, 904, 905, 906, 907, 908, 909, 910, 911, 912, and/or 913 may be the same or similar to steps 801, 802, 804, 805, 806, 807, 808, 809, 810, 811, 812, and/or 813, respectively.

At step 901, timestamp (e.g., in the form of watermarks) in the return metadata may be used to construct a timestamp interval at step 911 around time t. All return captions falling within the timestamp interval may be collected from a return captions buffer 902 that temporarily stores the return captions. At step 903, an original caption (for example, a single original caption) retrieved from the original metadata (at step 912) may be selected for comparison against the return metadata obtained from the return captions buffer 902. At steps 904, the original (e.g., scheduled) and/or return metadata may be text-cleaned, and at step 905, the original and return metadata may be compared to determine, for example, their Levenshtein distance, in a manner similar to that described above with respect to step 805. Thus, the process of FIG. 9 may involve analyzing whether each original caption is also present in the return metadata. Such a process may allow for checking whether any of the original captions were skipped over or otherwise missing from the return metadata.

Figure 10:
FIG. 10 is a flow chart showing an example process to determine a caption source if a return caption does not sufficiently match a scheduled caption.

FIG. 10 is a block diagram of an example process for detecting anomalies in captions, such as when an original caption appears to be missing (or otherwise cannot be found) in the return metadata, or when a return caption does not sufficiently match a corresponding original caption. This process may be part of step 807 and/or step 907, and may be performed each time that step 807 and/or step 907 is performed. For example, the process of FIG. 10 may be performed in response to a determination that an anomaly exists, such as when a sufficient match between the text-cleaned original metadata and the text-cleaned return metadata is not found. It may be desirable to determine (for example, estimate) the original caption data (e.g., the original metadata) with which the return caption (e.g., the return metadata) should be associated. At step 1001, a timestamp may be determined (for example, approximated) based on the last known offset value d. The timestamp approximation may be computed as, for example, the difference from the timestamp of the return metadata that was compared at step 905 and the last known value of d. At step 1002, a request indicating the determined timestamp may be issued to the component responsible for implementing the metadata finder 813 step. In response, the metadata finder may return one or more items of content (programs) that are scheduled to begin at, end at, and/or encompass a time that is based on the determined timestamp, such as a time that is at or near the determined timestamp (for example, within a threshold time range of the determined timestamp). Subsequently, at step 1003, the returned one or more items of content may be associated with the anomaly.

The above-described processes may additionally or alternatively be used for return information other than captions. For example, the processes may be used to determine anomalies in return ratings data, in return ratings flags (also sometimes referred to as content descriptors), and/or in return SCTE-35 signaling.

Figure 11:
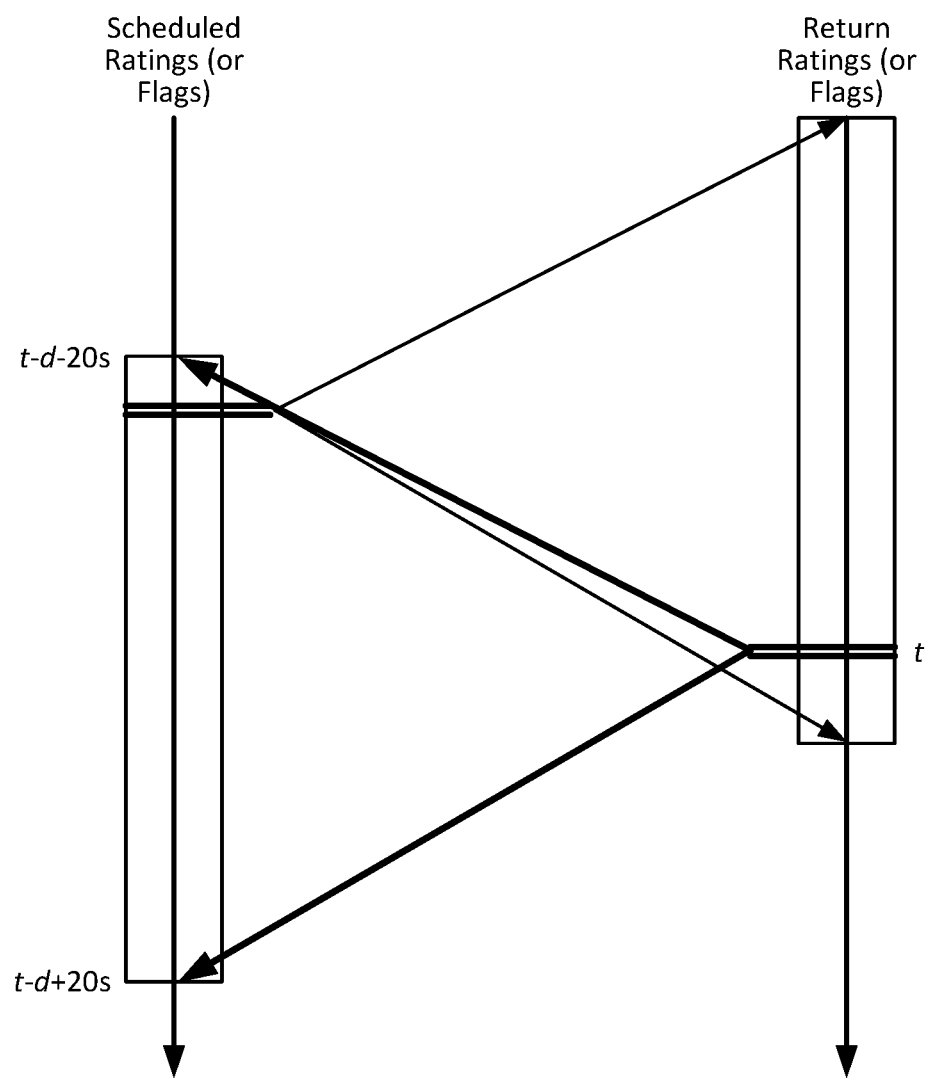
FIG. 11 shows an example of simultaneous forward and reverse matching detection for ratings and/or flags.

For example, FIG. 11 illustrates an example of forward and reverse detection for ratings data (for example, V-chip ratings data) or for flags, where the window W in this example is 40 seconds. The detection process may be used to compare scheduled ratings in original content with actual ratings returned in content (for example, in content that is actually for delivery to one or more end user devices). The comparisons in FIG. 11 may be performed in the same or similar ways as discussed above with regard to FIGS. 3-9, except scheduled ratings and return ratings may be substituted for original (e.g., scheduled) captions and return captions. Examples of ratings include the V-chip ratings D (suggestive dialogue), L (coarse or crude language), S (sexual situations), V (violence), and FV (fantasy violence). However, any other ratings may be used.

Figure 12:
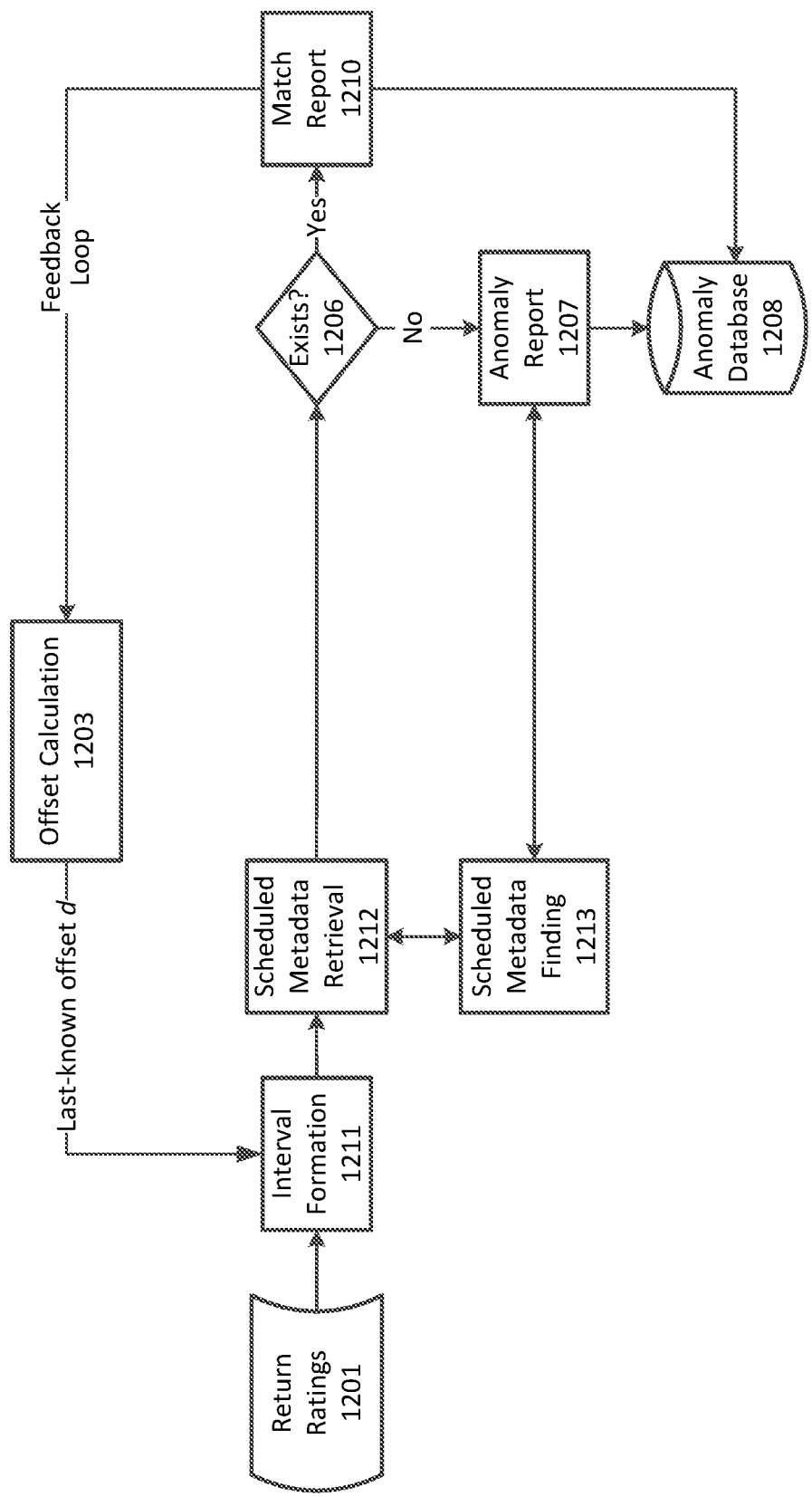
FIG. 12 is a flow chart showing an example process for determining whether return ratings sufficiently match scheduled ratings.

FIG. 12 is a block diagram showing an example process implementing this for ratings data. At step 1201, return content may be sampled to extract ratings data therein. These extracted ratings will be referred to herein as return ratings. At step 1211, a time interval of the sliding time window may be determined. The interval of the time window may be a default length (e.g., predetermined), and may have a beginning that is based at least in part on the time t and the last-known time offset d, similar to how the time intervals described above are determined. Thus, step 1211 may determine the window of time (for example, [t−d−20 seconds, t−d+20 seconds]) that is used for retrieval and comparison of the scheduled ratings and the return ratings.

At steps 1212 and 1213, original ratings and the return ratings that correspond to the time window determined in step 1211 (and offset by d) may be found and retrieved from storage.

At step 1206, it may be determined whether, for a given scheduled rating (e.g., a given scheduled V-chip rating stamped at time t), a corresponding return rating (e.g., a corresponding return V-chip rating) exists within the time window that was determined at step 1211. If a matching return rating does exist, then a match report may be generated at step 1210, and this may be stored in a database such as an anomaly database (step 1208) and/or fed back to an offset calculation to be performed at step 1203, which may determine the new value of offset d in a similar manner as described previously with regard to step 803. In addition, the match report, or an indication of the match associated with the match report, may be displayed to a human user, such as via any of servers 105-107. If there is not a matching return rating, then an anomaly report may be generated at step 1207, which may be stored in the anomaly database at step 1208.

At step 1203, the time offset d may be updated so that the next time window formed (during the next iteration of step 1211 at the next time t) uses the updated time offset d. Offset d may be updated based on the match report generated at step 1210, in a manner similar to that described above with respect to step 803.

Figure 13:
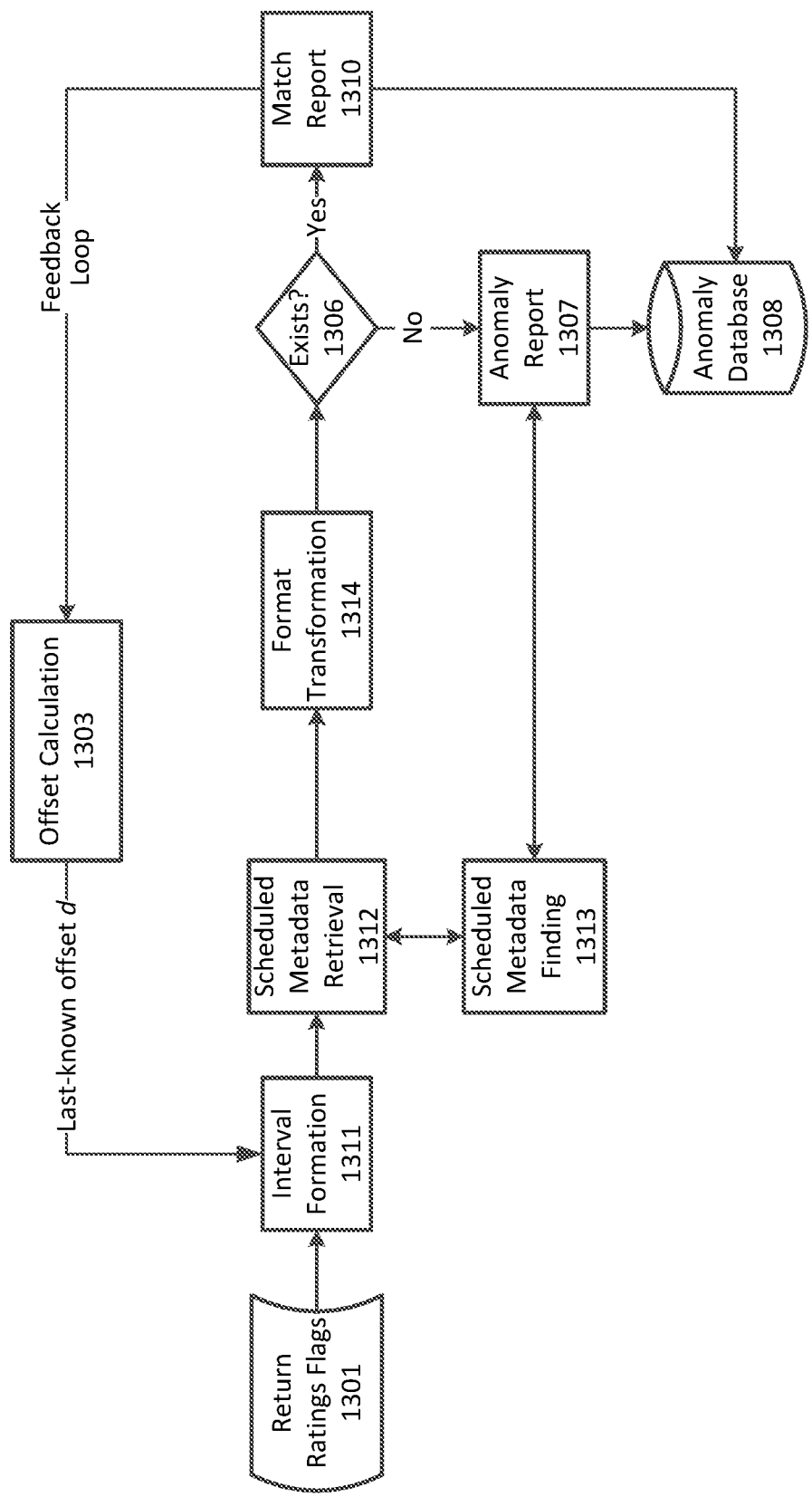
FIG. 13 is a flow chart showing an example process for determining whether return flags sufficiently match scheduled flags.

FIG. 13 is a block diagram showing an example process implementing an anomaly detection process for return ratings flags. In general, steps 1301, 1303, 1306, 1307, 1308, 1310, 1311, 1312, 1313, and 1314 may be the same or similar to steps 1201, 1203, 1206, 1207, 1208, 1210, 1211, 1212, 1213, and 1214, respectively, except that scheduled ratings flags and return ratings flags may be compared for anomalies.

FIG. 13 also includes step 1314, in which the format of the rating flags may be converted into a common format. For example, in the return metadata, a V-chip rating flag may be reported only as "V", whereas in the original metadata, the corresponding V-chip rating flag may be listed differently such as "Violence." In this step, a mapping between different representations of the same rating flag, such as by mapping abbreviations with their corresponding full text descriptions, may be made.

Figure 14:
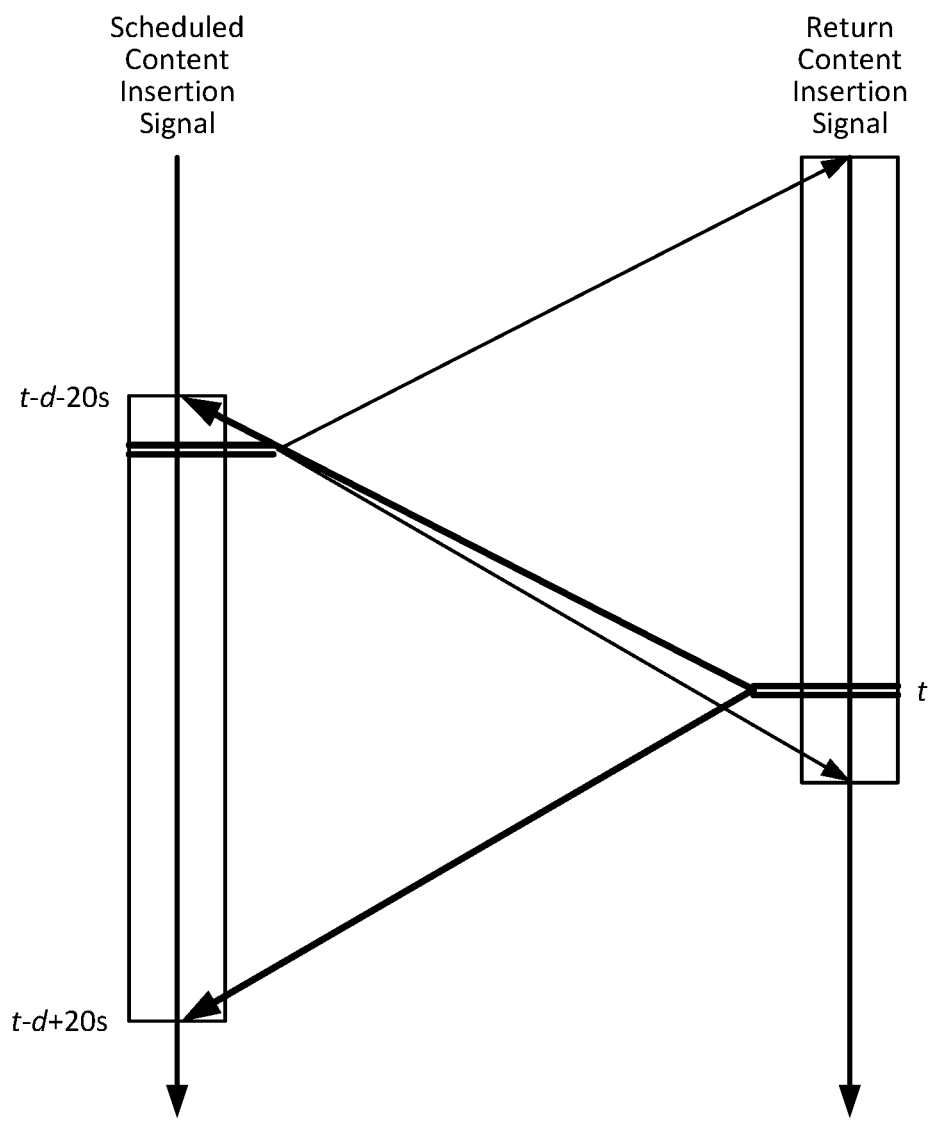
FIG. 14 shows an example of simultaneous forward and reverse matching detection for SCTE-35 signaling.

FIG. 14 illustrates an example of forward and/or reverse detection for content insertion signals (for example, SCTE-35 signaling). The detection process may be used to compare scheduled content insertion signals in original content with actual content insertion signals returned in content ("return content insertion signals"), for example, in content that is actually for delivery to one or more end user devices. The comparisons in FIG. 14 may be performed in the same or similar ways as discussed above with regard to FIGS. 3-13, except that scheduled content insertion signals and return content insertion signals may be substituted for original (e.g., scheduled) captions and return captions, for scheduled ratings and return ratings, or for scheduled flags and return flags.

Figure 15:
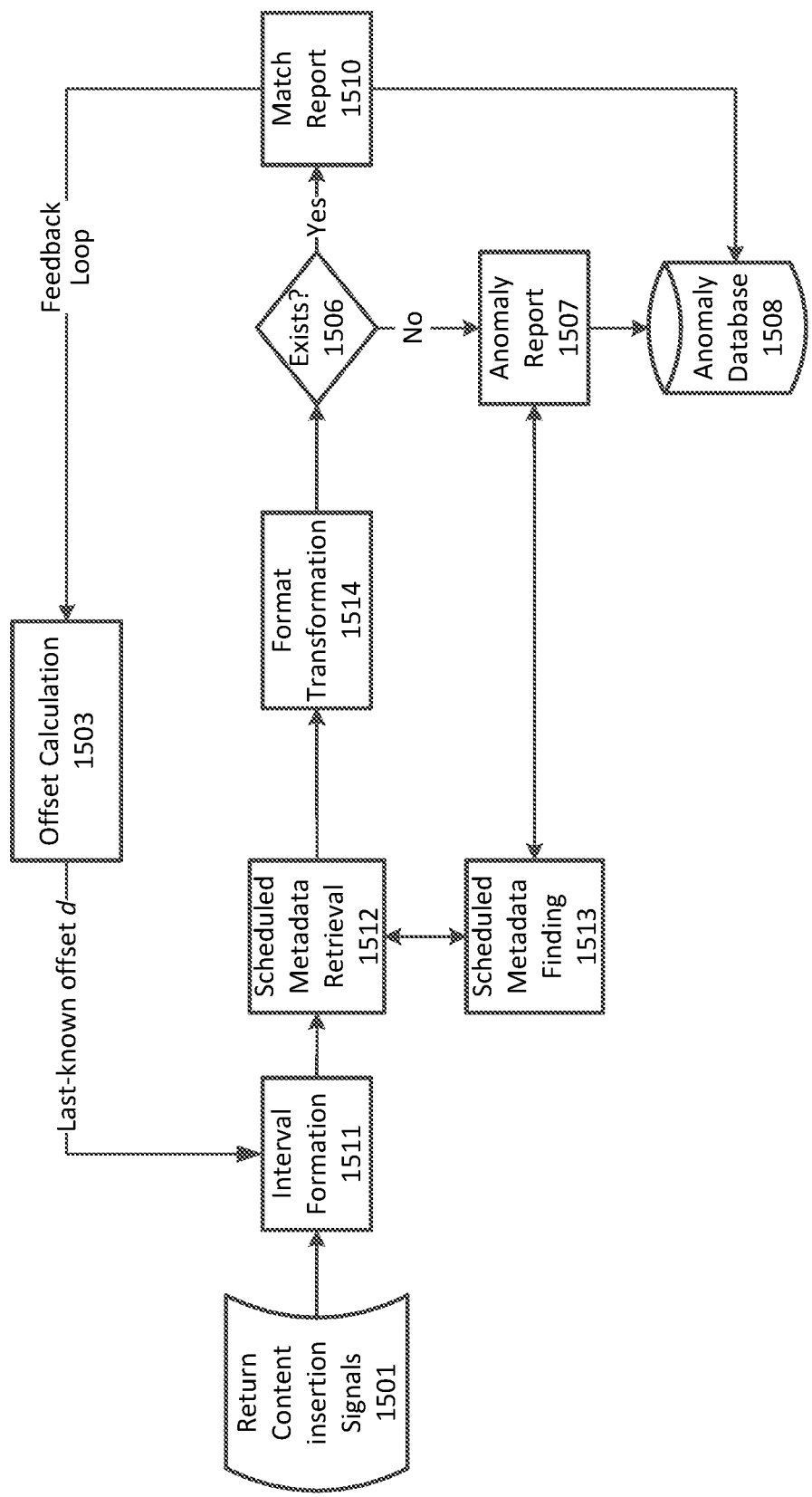
FIG. 15 is a flow chart showing an example process for determining whether return SCTE-35 signaling sufficiently matches scheduled SCTE-35 signaling.

FIG. 15 is a block diagram showing an example process implementing this for content insertion signals, such as SCTE-35 signals. At step 1501, return content may be sampled to extract associated content insertion signals. These extracted content insertion signals will be referred to herein as return content insertion signals. At step 1511, a time interval of a sliding time window may be determined. The interval of the time window may be a default length (e.g., predetermined), and may have a beginning that is based at least in part on the last-known time offset d. Thus, step 1511 may determine the window of time (for example, [t−d−20 seconds, t−d+20 seconds]) that is used for retrieval and comparison of the scheduled SCTE-35 signals and the return content insertion signals.

At steps 1512 and 1513, the scheduled content insertion signals and return content insertion signals corresponding to the time window determined in step 1511 may be found and retrieved from storage.

At step 1506, it may be determined whether, for a given scheduled content insertion signal (e.g., a given scheduled content insertion signal stamped at time t), a corresponding return content insertion signal exists within the time window that was determined at step 1511. If a matching return content insertion signal does exist, then a match report may be generated at step 1510, and this may be stored in a database such as an anomaly database (step 1508) and/or fed back to an offset calculation to be performed at step 1503, which may update the value of offset d in response to a match report in a similar manner as described above with respect to step 803. The time offset d may be updated so that the next time window formed (during the next iteration of step 1511 at the next time t) uses the updated time offset d. In addition, the match report, or an indication of the match associated with the match report, may be displayed to a human user, such as via any of servers 105-107. If there is not a matching return content insertion signal, then an anomaly report may be generated at step 1507, which may be stored in the anomaly database at step 1508.

Figure 16:
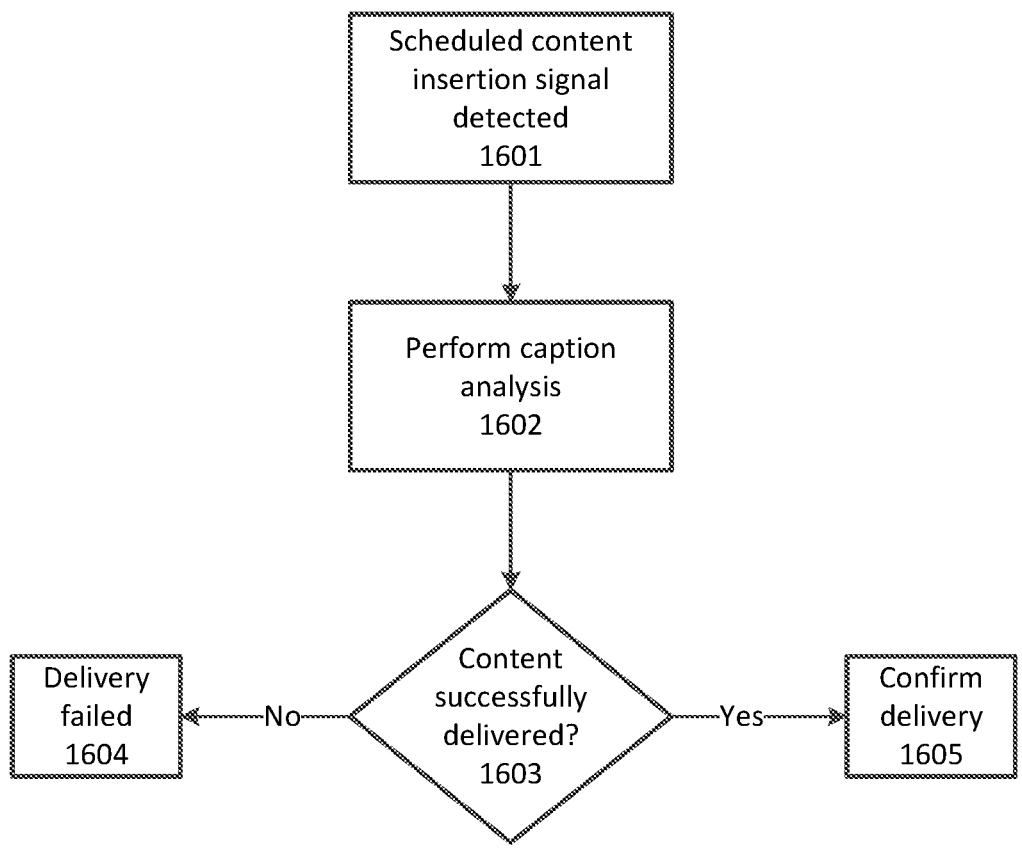
FIG. 16 is a flow chart showing an example process for determining whether scheduled inserted content has been successfully delivered.

As discussed above, it may be desirable to be able to determine whether a scheduled item of content (such as an advertisement), for insertion in another item of content being delivered, was correctly delivered to end users. For example, detection of a scheduled content insertion signal for a given item of inserted content may trigger a process where scheduled closed captioning or other metadata for the inserted scheduled content is compared with delivered (return) closed captioning for the inserted scheduled content. FIG. 16 is a flow chart showing such an example process that may be used for determining whether scheduled inserted content has been successfully delivered. At step 1601, a content insertion signal (such as an SCTE-35 signal) may be detected in the scheduled content currently being sent for delivery to end users. In response to determining that the insertion signal is in the scheduled content currently being sent, step 1602 may be performed. At step 1602, a comparison may be performed between the scheduled inserted content and corresponding return content. For example, scheduled caption metadata of the inserted scheduled content may be compared with return caption metadata for return content, such as described herein with respect to FIGS. 3-10. For example, a determination that a particular scheduled content insertion signal corresponds to particular scheduled content currently being delivered (or recently delivered such as within a given past time window), any one or more of FIGS. 3-10 may be performed, wherein the schedule content in those figures would be the particular scheduled content being inserted. At step 1603, it may be determined whether the scheduled content being inserted was successfully delivered, as sampled in the monitored return content. This may be determined, for example, based on whether a match report was generated (for example, in steps 308, 810, and/or 910) or an anomaly report was generated (for example, in steps 307, 807, and/or 907). If it was determined in step 1603 that content was successfully delivered (for example, if a match report was generated for the scheduled content to be inserted), then at step 1605 the delivery of the scheduled content to be inserted may be confirmed, such as by any of servers 105-107 displaying an indication of the confirmation to a human user. If, on the other hand, it was determined in step 1603 that content was not successfully delivered (for example, if an anomaly report was generated for the scheduled content to be inserted), then at step 1604 failure of the delivery of the scheduled content to be inserted may be determined, such as by any of servers 105-107 displaying an indication of the failure to a human user.

Any of the components in the processes of FIGS. 3-16 may generate an "alive" message to indicate that the component is up and running. The "alive" message may be sent by each component periodically, such as every thirty minutes or any other fixed or variable interval of time.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   transmitting one or more scheduled captions corresponding to scheduled content;
   comparing the one or more scheduled captions with one or more return captions corresponding to content that was sent for presentation on a user device, wherein the comparing comprises:
      determining a scheduled caption time window corresponding to the one or more scheduled captions;
      determining, based on a time offset from the scheduled caption time window, a return caption time window;
      determining, based on the return caption time window, the one or more return captions; and
      determining a difference between text of the one or more scheduled captions and text of the one or more return captions; and
   confirming delivery of the scheduled content based on the difference being less than a threshold amount.

2. The method of claim 1, further comprising changing, based on comparing of another one or more scheduled captions with another one or more return captions, the time offset.

3. The method of claim 1, further comprising:
   changing, based on determining that a difference between text of another one or more scheduled captions and text of another one or more return captions is less than the threshold amount, the time offset.

4. The method of claim 1, wherein the comparing comprises determining a time offset between the text of the one or more scheduled captions and the text of the one or more return captions, and wherein the method further comprises:
   changing, based on the time offset between text of another one or more scheduled captions and text of another one or more return captions, the time offset from the scheduled caption time window.

5. The method of claim 1, wherein the determining the one or more return captions comprises performing optical character recognition of the content that was sent for presentation on the user device.

6. A method comprising:
   determining, based on a scheduled content insertion signal, a scheduled caption time window and a return caption time window;
   determining, based on the scheduled caption time window, a scheduled item of inserted content;

determining, based on the return caption time window, one or more return captions of return content;

comparing one or more scheduled captions of the scheduled item of inserted content with the one or more return captions of return content; and confirming delivery of the scheduled item of inserted content based on the comparing resulting in a determination of a match between at least one of the one or more scheduled captions and at least one of the one or more return captions.

7. The method of claim 6, wherein the scheduled content insertion signal comprises an SCTE-35 signal.

8. The method of claim 6, wherein the one or more return captions were generated for delivery within the scheduled caption time window.

9. The method of claim 6, wherein the one or more scheduled captions are scheduled to occur within the scheduled caption time window.

10. The method of claim 6, further comprising generating, based on the comparing, a match report corresponding to the scheduled item of inserted content, wherein the confirming comprises confirming delivery of the scheduled item of inserted content based on the match report.

11. The method of claim 6, wherein the determining the one or more return captions comprises performing optical character recognition of the return content.

12. The method of claim 1, wherein the determining the one or more return captions comprises determining the one or more return captions separately from signals transmitted to the user device.

13. An apparatus comprising:
one or more processors; and
memory storing instructions that, when executed by the one or more processors, cause the apparatus to:
transmit one or more scheduled captions corresponding to scheduled content;
compare the one or more scheduled captions with one or more return captions corresponding to content that was sent for presentation on a user device, by at least:
determining a scheduled caption time window corresponding to the one or more scheduled captions;
determining, based on a time offset from the scheduled caption time window, a return caption time window;
determining, based on the return caption time window, the one or more return captions; and
determining a difference between text of the one or more scheduled captions and text of the one or more return captions; and
confirm delivery of the scheduled content based on the difference being less than a threshold amount.

14. The apparatus of claim 13, wherein the instructions, when executed by the one or more processors, further cause the apparatus to:
change, based on comparing of another one or more scheduled captions with another one or more return captions, the time offset.

15. The apparatus of claim 13, wherein the instructions, when executed by the one or more processors, further cause the apparatus to:
change, based on determining that a difference between text of another one or more scheduled captions and text of another one or more return captions is less than the threshold amount, the time offset.

16. The apparatus of claim 13, wherein the instructions, when executed by the one or more processors, cause the apparatus to compare the one or more scheduled captions with the one or more return captions, by at least determining a time offset between the text of the one or more scheduled captions and the text of the one or more return captions, and
wherein the instructions, when executed by the one or more processors, further cause the apparatus to change, based on the time offset between text of another one or more scheduled captions and text of another one or more return captions, the time offset from the scheduled caption time window.

17. The apparatus of claim 13 wherein the instructions, when executed by the one or more processors, cause the apparatus to determine the one or more return captions based on optical character recognition of the content that was sent for presentation on the user device.

18. The apparatus of claim 13, wherein the instructions, when executed by the one or more processors, cause the apparatus to determine the one or more return captions separately from signals transmitted to the user device.

19. An apparatus comprising:
one or more processors; and
memory storing instructions that, when executed by the one or more processors, cause the apparatus to:
determine, based on a scheduled content insertion signal, a scheduled caption time window and a return caption time window;
determine, based on the scheduled caption time window, a scheduled item of inserted content;
determine, based on the return caption time window, one or more return captions of return content;
compare one or more scheduled captions of the scheduled item of inserted content with the one or more return captions of return content; and
confirm delivery of the scheduled item of inserted content based on the comparing resulting in a determination of a match between at least one of the one or more scheduled captions and at least one of the one or more return captions.

20. The apparatus of claim 19, wherein the scheduled content insertion signal comprises an SCTE-35 signal.

21. The apparatus of claim 19, wherein the one or more return captions were generated for delivery within the scheduled caption time window.

22. The apparatus of claim 19, wherein the one or more scheduled captions are scheduled to occur within the scheduled caption time window.

23. The apparatus of claim 19, wherein the instructions, when executed by the one or more processors, further cause the apparatus to generate, based on the comparing, a match report corresponding to the scheduled item of inserted content, and to confirm the delivery of the scheduled item of inserted content based on the match report.

24. The apparatus of claim 19, wherein the instructions, when executed by the one or more processors, cause the apparatus to determine the one or more return captions based on optical character recognition of the return content.

* * * * *